Figure 1:
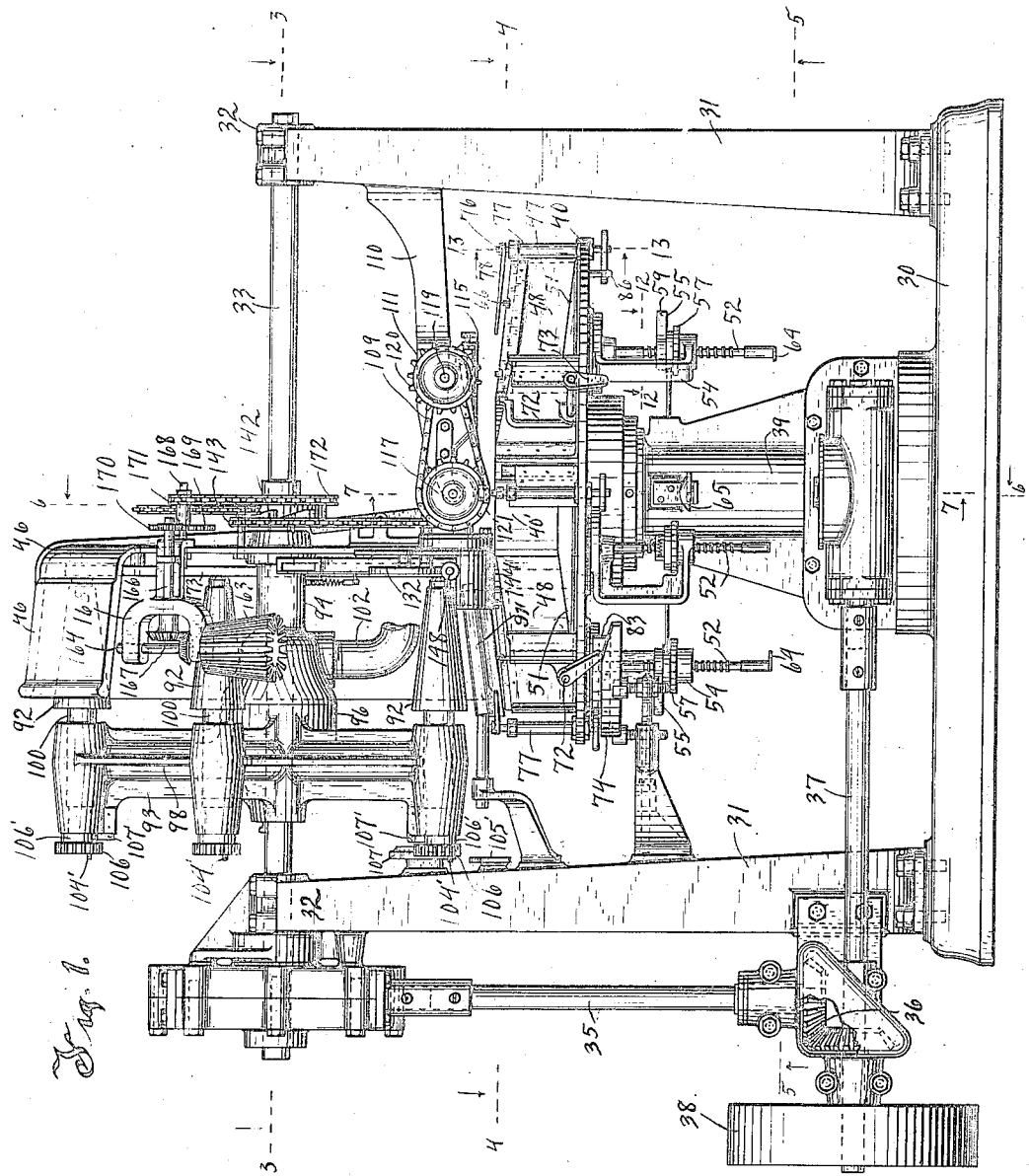

M. P. JANISCH.
PAPER BOTTLE FORMING MACHINE.
APPLICATION FILED SEPT. 17, 1913.

1,134,272.

Patented Apr. 6, 1915.
12 SHEETS—SHEET 3.

WITNESSES.
C. F. Milton.
Katherine Holt.

INVENTOR
Maximillian P. Janisch.
By Morsell & Caldwell.
ATTORNEYS.

M. P. JANISCH.
PAPER BOTTLE FORMING MACHINE.
APPLICATION FILED SEPT. 17, 1913.

1,134,272.

Patented Apr. 6, 1915.
12 SHEETS—SHEET 4.

WITNESSES
G. F. Miller
Katherine Holt

INVENTOR.
Maximillian P. Janisch,
B. Morsell & Caldwell
ATTORNEYS.

M. P. JANISCH.
PAPER BOTTLE FORMING MACHINE.
APPLICATION FILED SEPT. 17, 1913.

1,134,272.

Patented Apr. 6, 1915.
12 SHEETS—SHEET 9.

WITNESSES
C. F. Miller
Katherine Holt

INVENTOR
Maximillian P. Janisch.
By Morsell & Caldwell
ATTORNEYS.

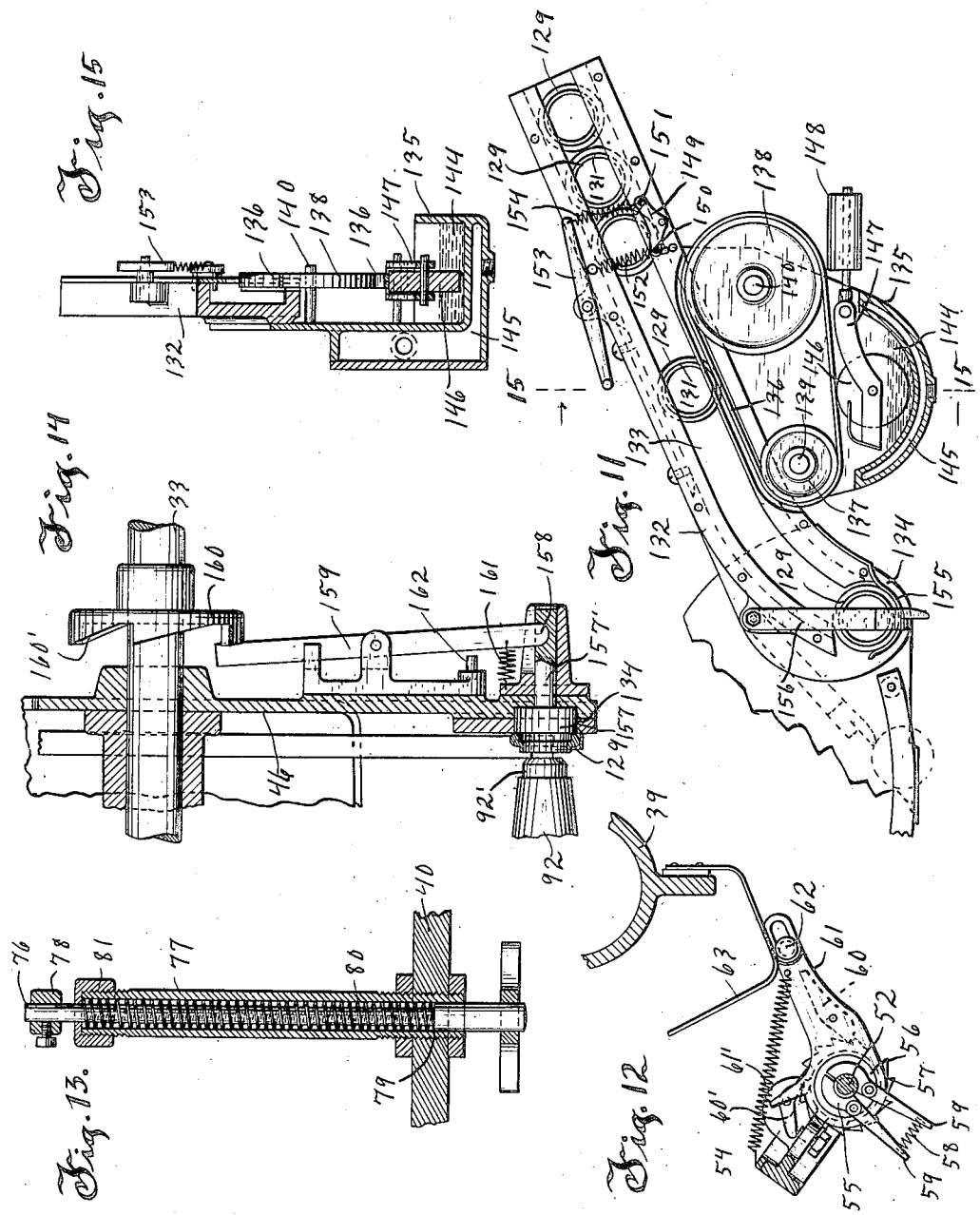

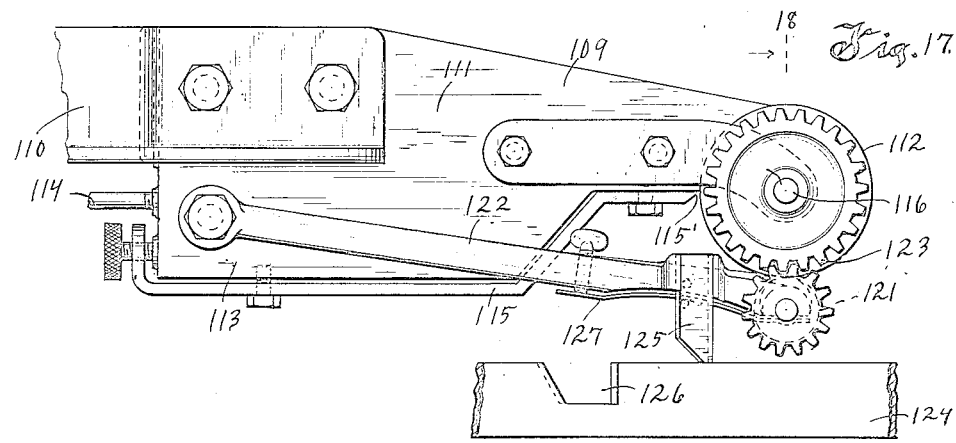
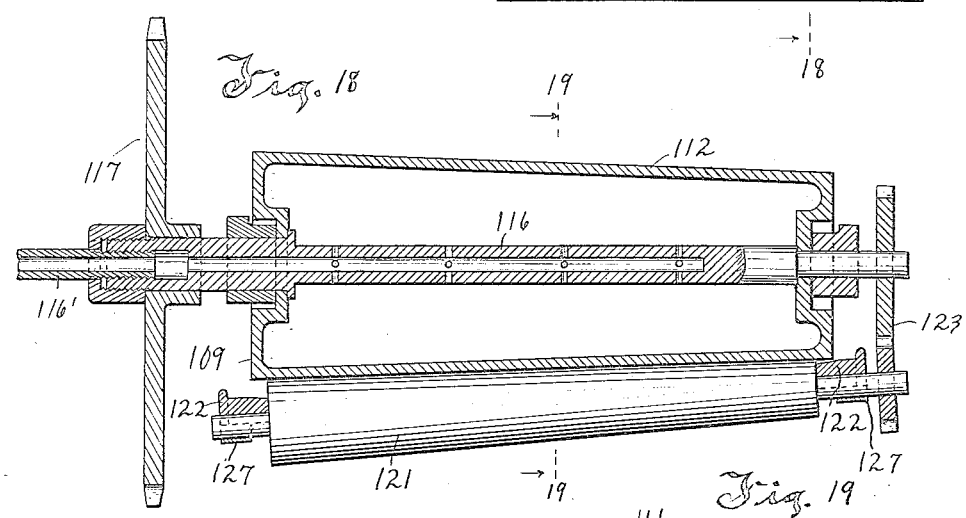
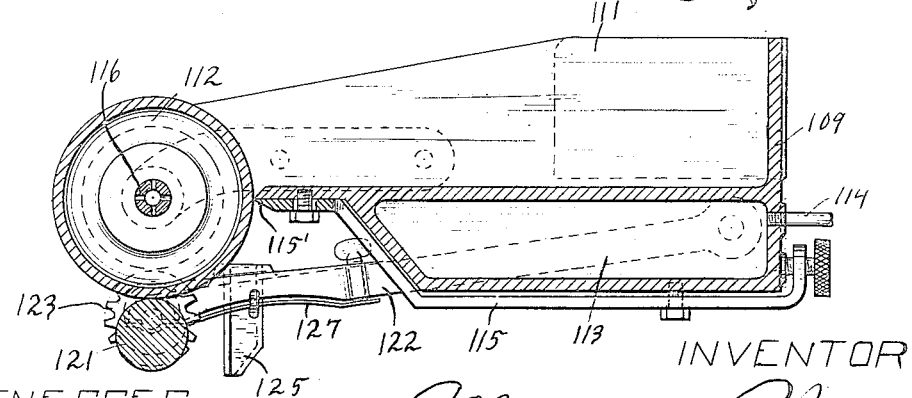

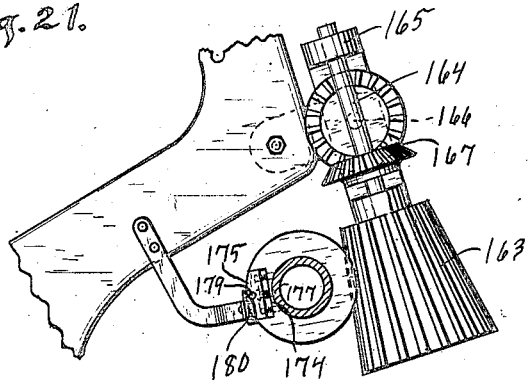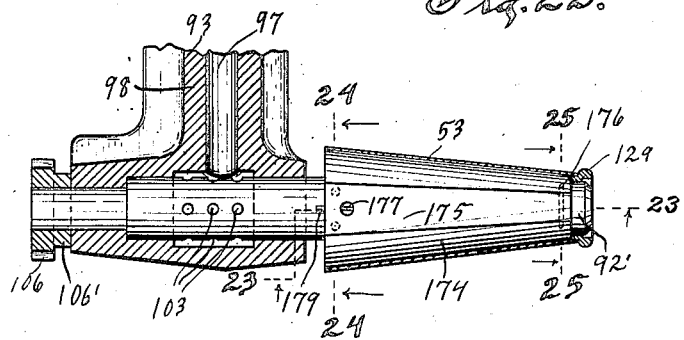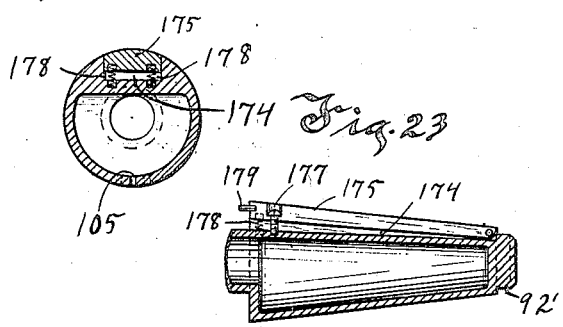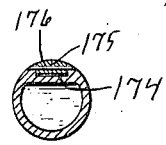

UNITED STATES PATENT OFFICE.

MAXIMILLIAN P. JANISCH, OF MILWAUKEE, WISCONSIN, ASSIGNOR TO U. S. FIBER BOTTLE MACHINERY COMPANY, OF MILWAUKEE, WISCONSIN, A CORPORATION OF WISCONSIN.

PAPER-BOTTLE-FORMING MACHINE.

1,134,272.              Specification of Letters Patent.        Patented Apr. 6, 1915.

Application filed September 17, 1913. Serial No. 790,226.

*To all whom it may concern:*

Be it known that I, MAXIMILLIAN P. JANISCH, a citizen of the United States, and resident of Milwaukee, in the county of Milwaukee and State of Wisconsin, have invented new and useful Improvements in Paper-Bottle-Forming Machines, of which the following is a description, reference being had to the accompanying drawings, which are a part of this specification.

This invention relates to improvements in paper bottle forming machines.

It is one of the objects of the present invention to provide a paper bottle forming machine which is adapted to glue, form the body portions of the bottles from sheets of paper and then insert and glue wooden necks into the partly finished bottles.

A further object of the invention is, to provide a paper bottle forming machine with improved means for feeding the sheets of paper to the forming mechanism.

A further object of the invention is, to provide a paper bottle forming machine with vacuum means for separating and lifting the sheets of paper from the supply stock.

A further object of the invention is, to provide a paper bottle forming machine having an improved means for applying the glue to the sheets of paper and to the wooden neck portions of the bottles.

A further object of the invention is, to provide a paper bottle forming machine having means for automatically feeding upwardly the supply sheets of paper as the sheets are successively removed therefrom.

A further object of the invention is, to provide a paper bottle forming machine which is of comparatively simple construction, is strong and durable, and is well adapted for the purpose described.

With the above and other objects in view the invention consists of the improved paper bottle forming machine and its parts and combinations, as set forth in the claims, and all equivalents thereof.

Figure 2:
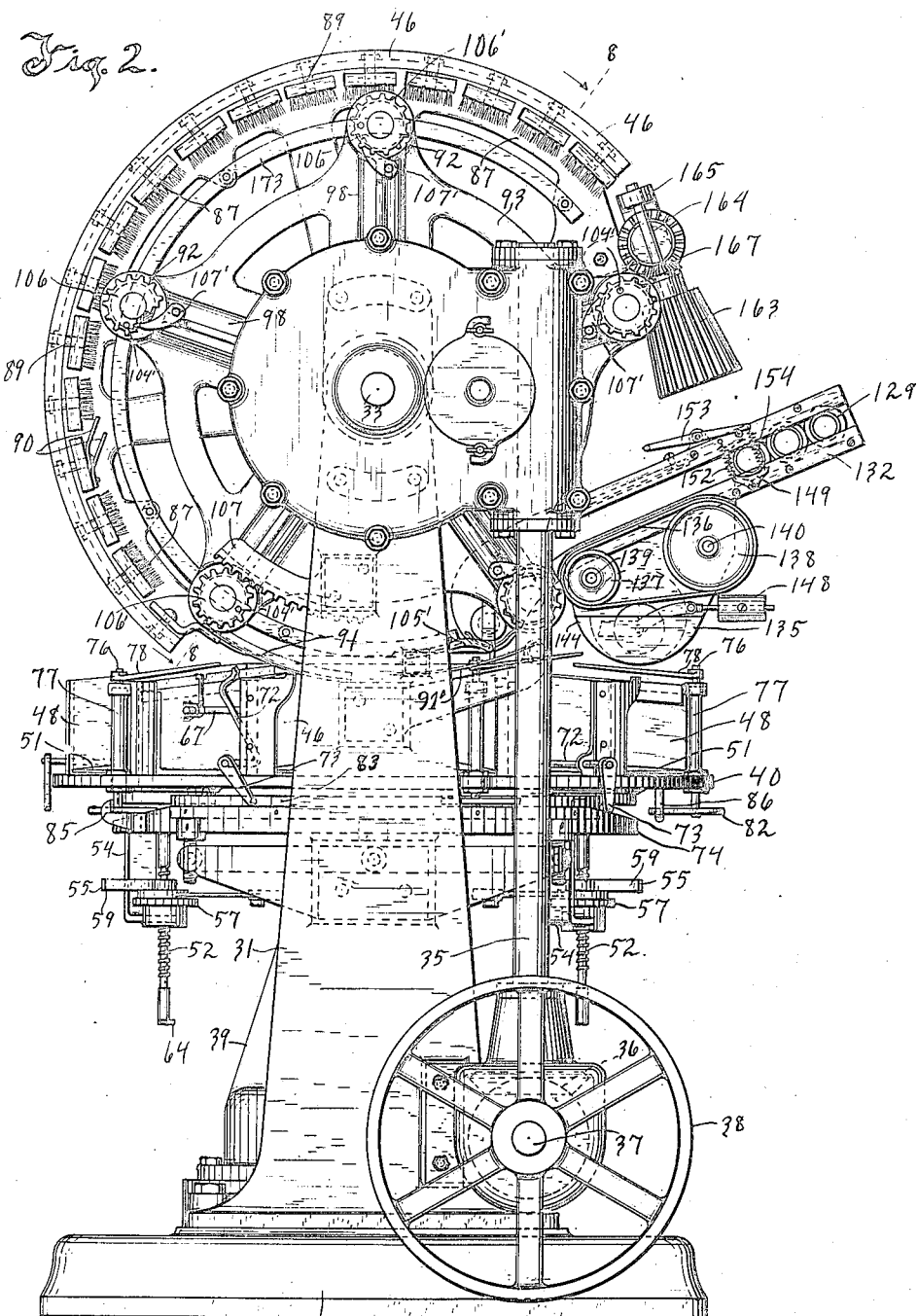
Figure 3:
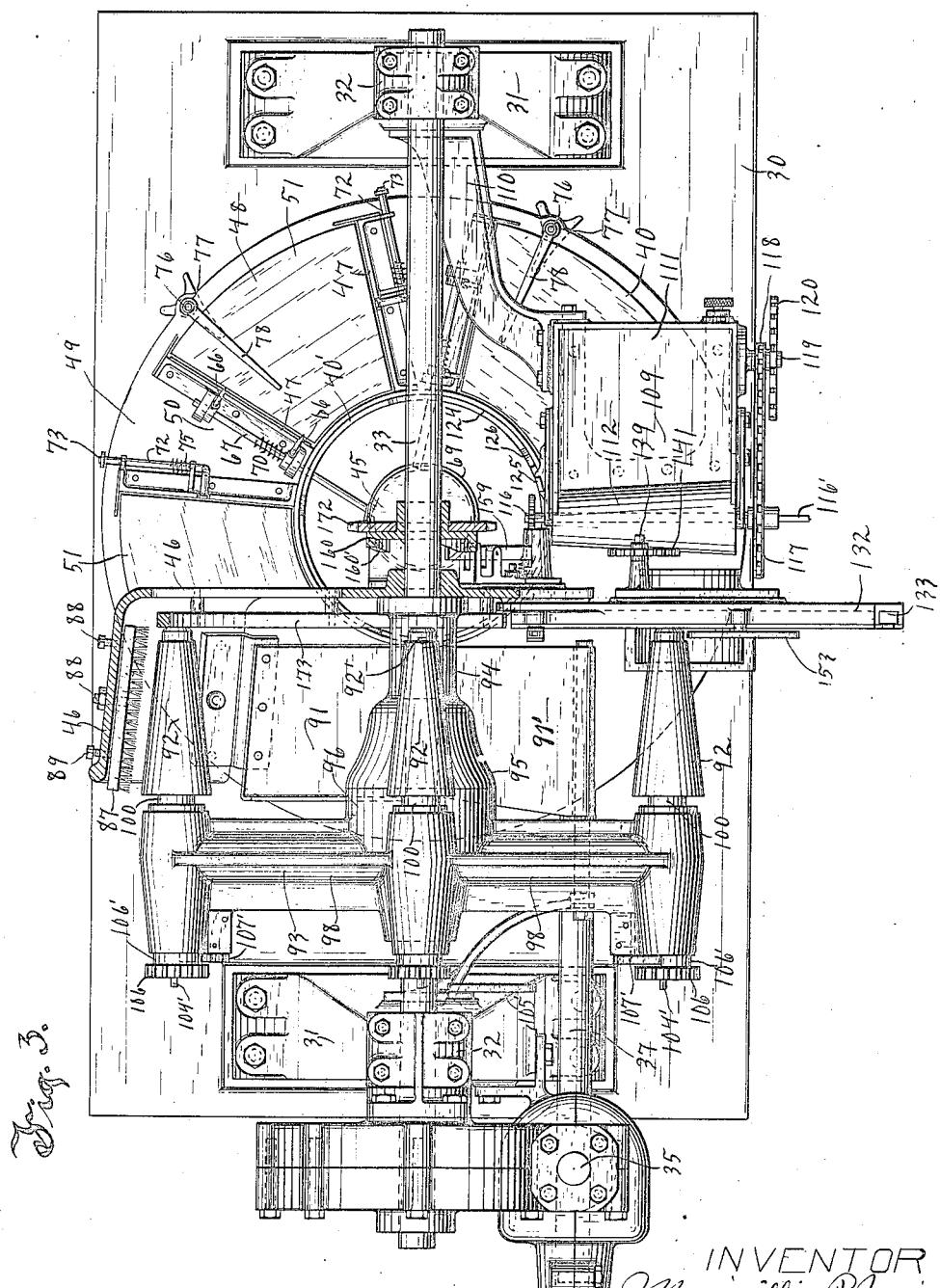
Figure 4:
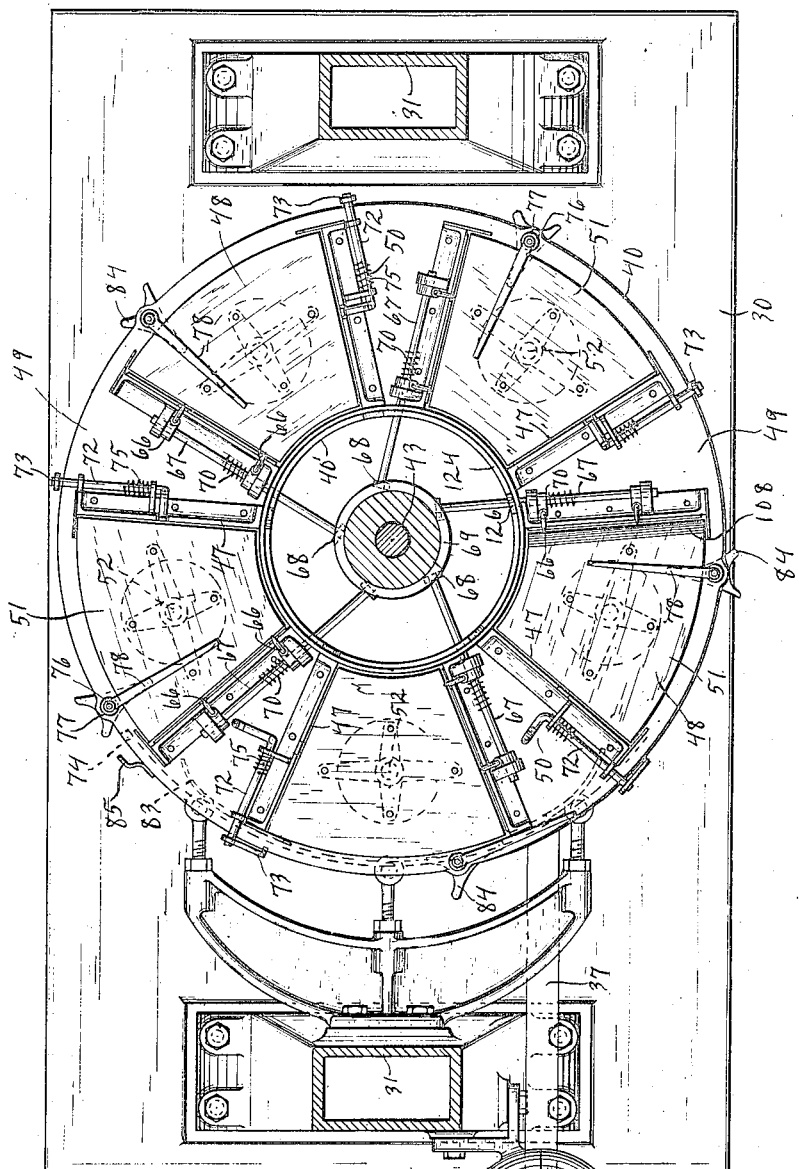
Figure 5:
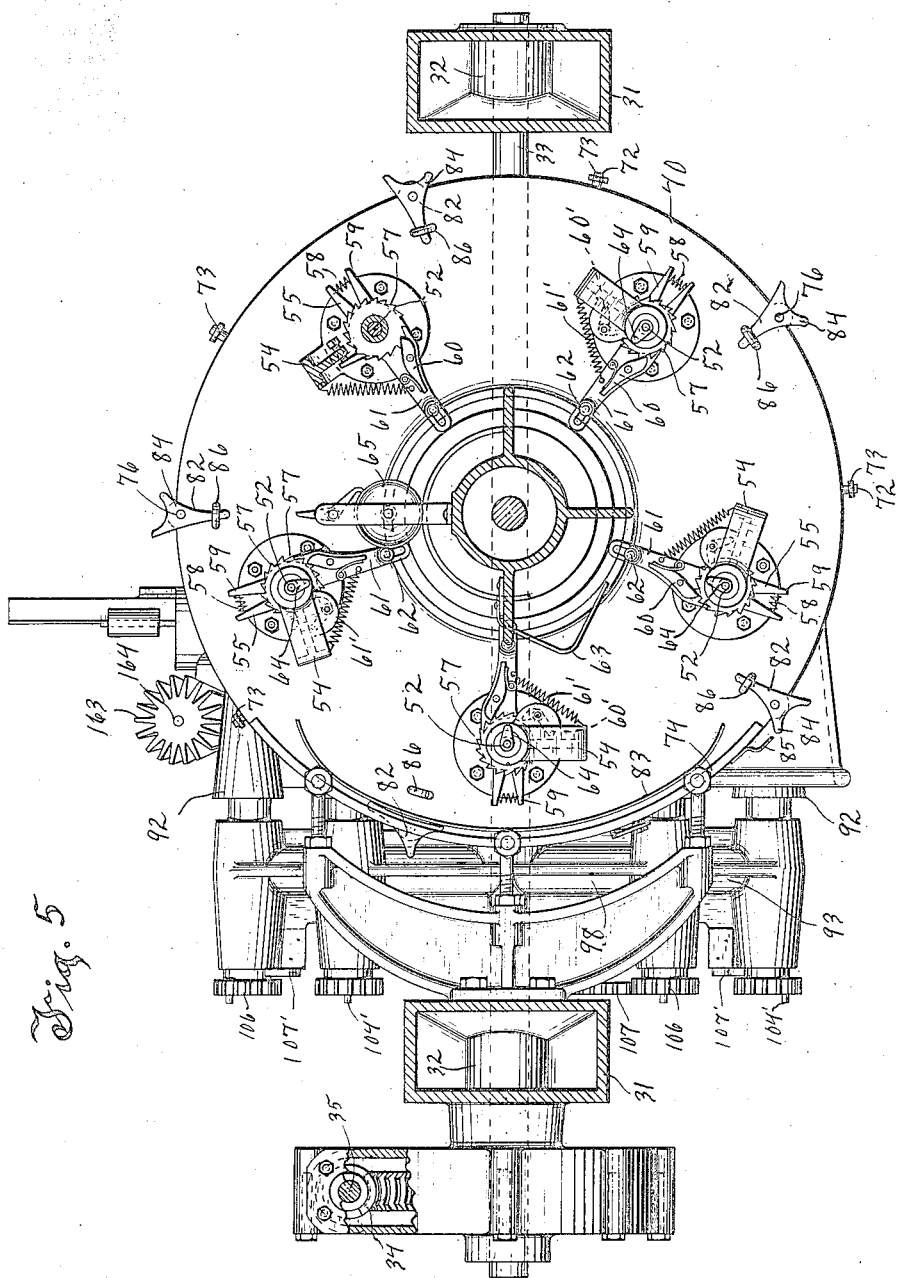
Figure 6:
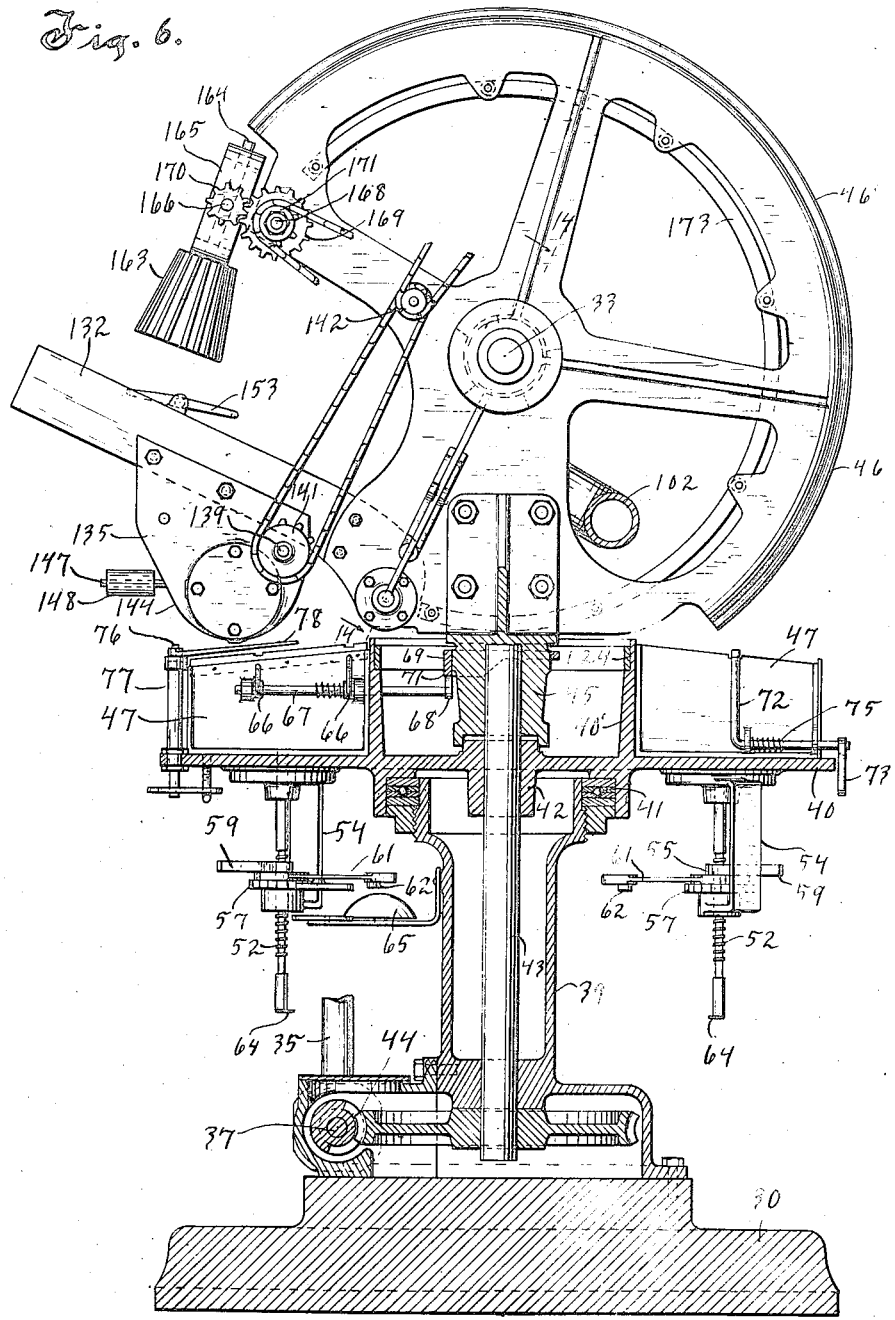
Figure 7:
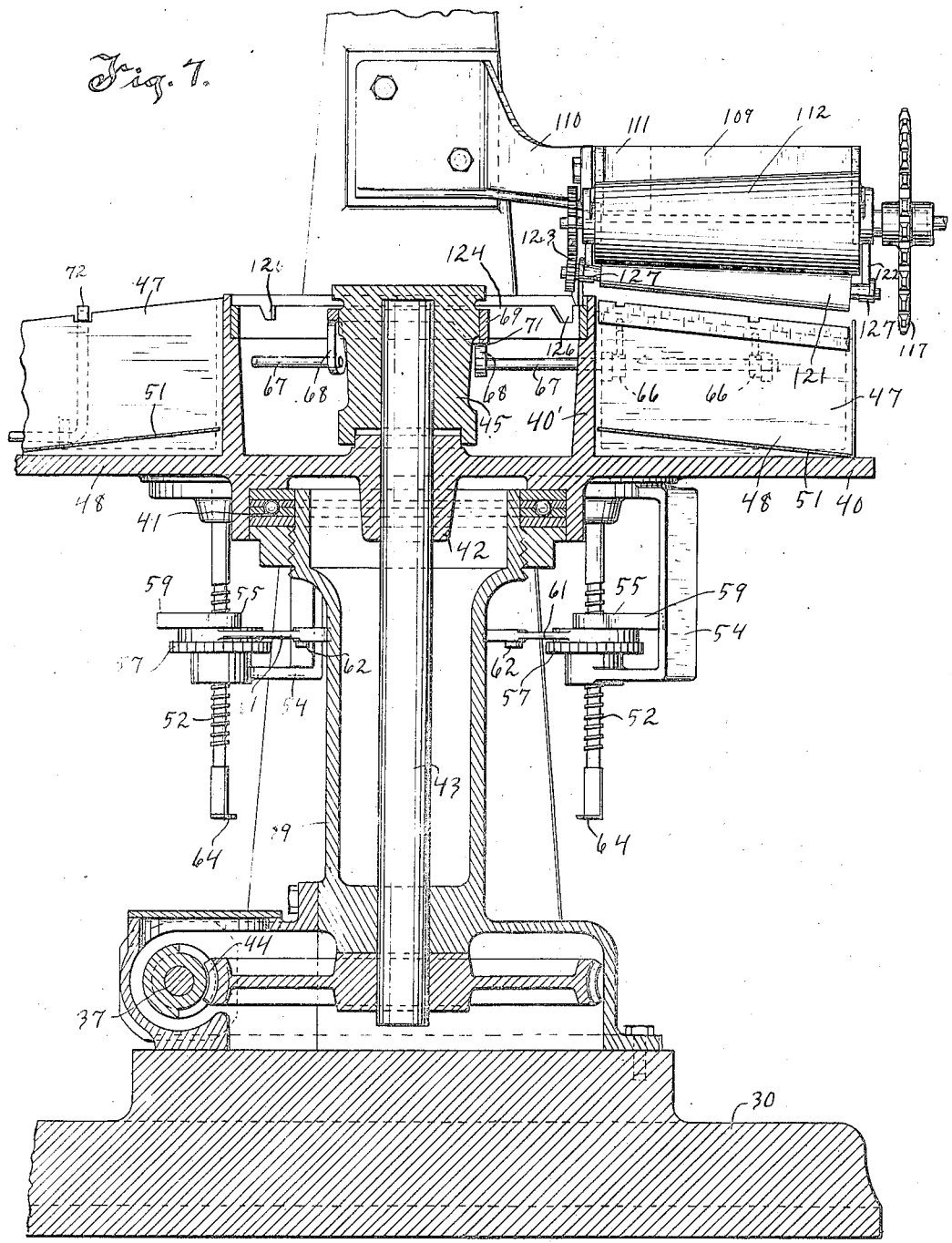
Figure 8:
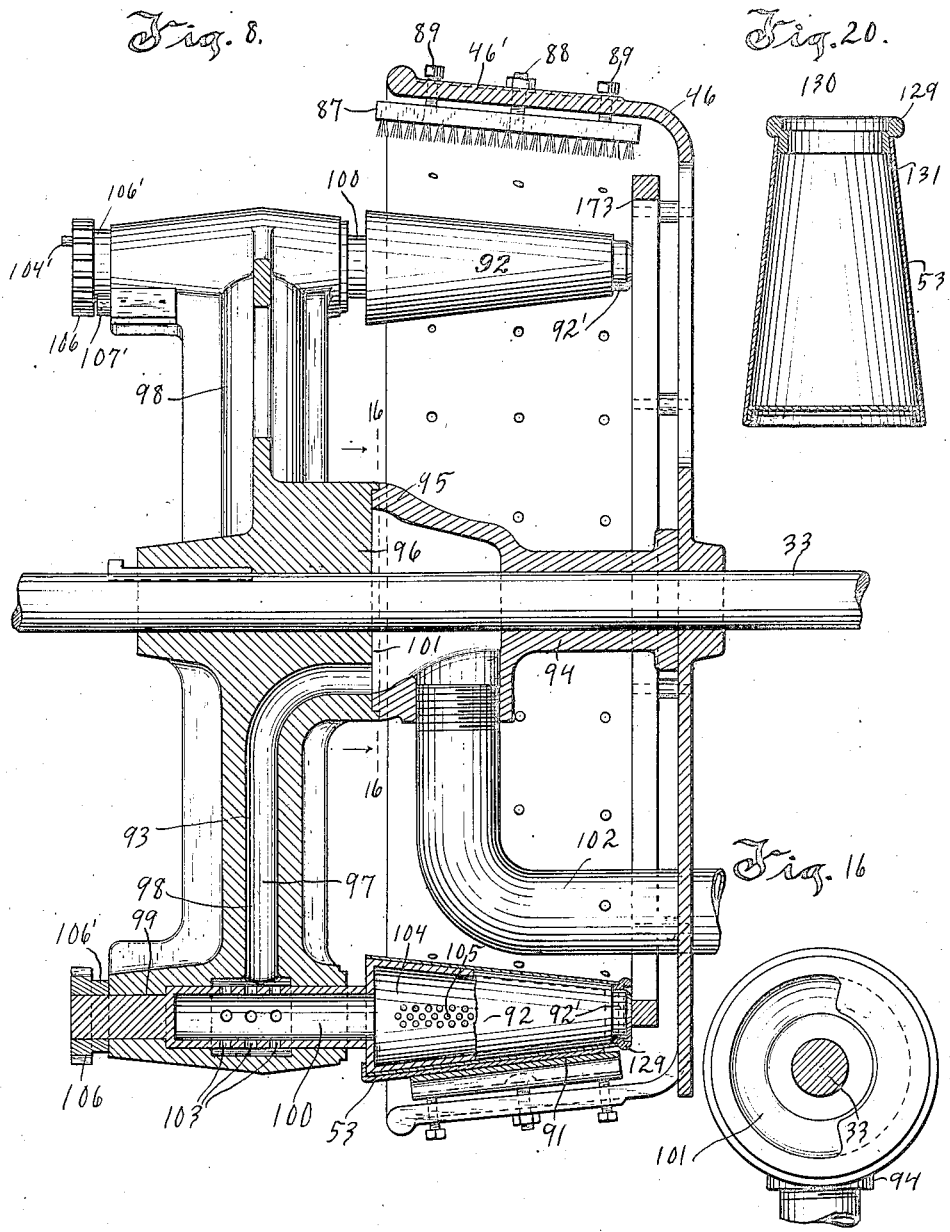
Figure 9:
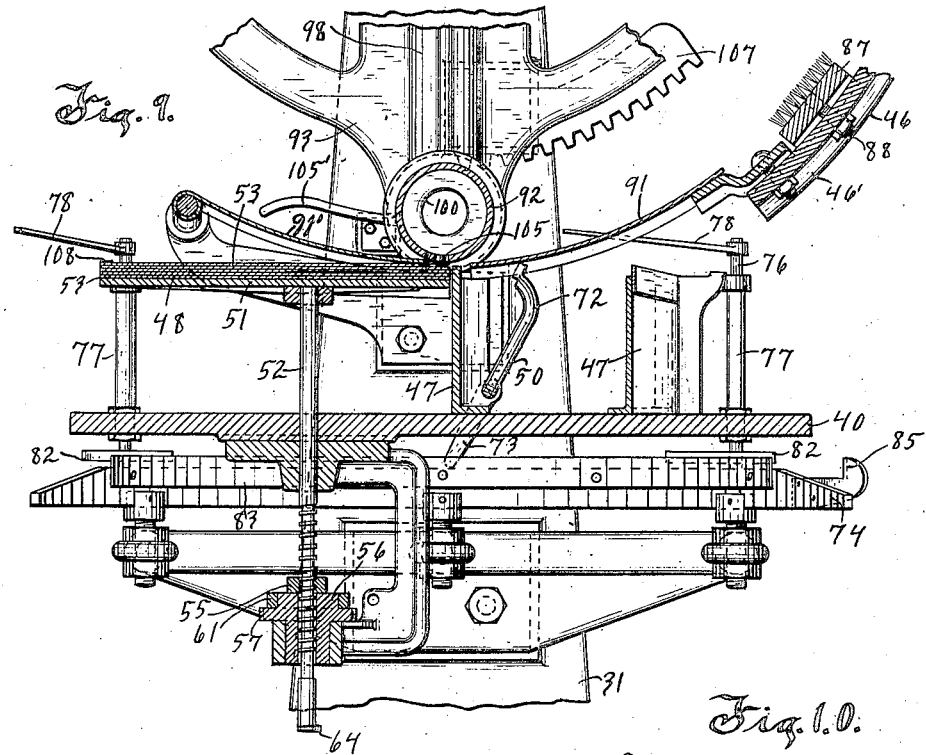
Figure 10:
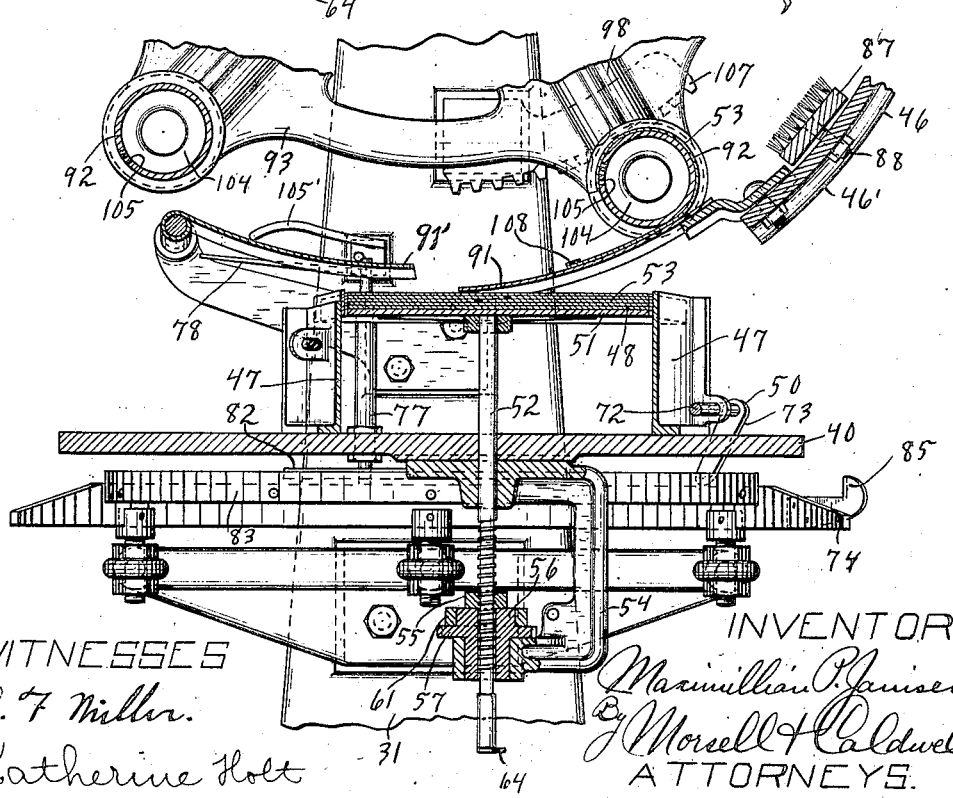

In the accompanying drawing in which the same reference characters indicate the same parts in all of the views:

Figure 1 is a front view of the improved paper bottle forming machine, a portion being broken away to show interior construction; Fig. 2 is an end view thereof on a larger scale; Fig. 3 is a transverse sectional view of the paper bottle forming machine, taken on line 3—3 of Fig. 1; Fig. 4 is a transverse sectional view thereof, taken on line 4—4 of Fig. 1; Fig. 5 is a similar view taken on line 5—5 of Fig. 1; Fig. 6 is a vertical sectional view taken on line 6—6 of Fig. 1; Fig. 7 is a vertical sectional view taken on line 7—7 of Fig. 1, the view being on a larger scale; Fig. 8 is a sectional view of the upper portion of the machine, taken on line 8—8 of Fig. 2; Fig. 9 is a sectional detail view of the means for removing sheets of paper from the supply stock, and also for elevating said stock as used; Fig. 10 is a similar view with the parts slightly advanced; Fig. 11 is a side view of the means for feeding the wooden necks of the bottles, and for applying glue thereto; Fig. 12 is a detail view of a portion of the paper feeding mechanism; Fig. 13 is a vertical sectional view thereof taken on line 13—13 of Fig. 1; Fig. 14 is a vertical sectional view taken on line 14—14 of Fig. 6; Fig. 15 is a vertical sectional view taken on line 15—15 of Fig. 11; Fig. 16 is a detail sectional view taken on line 16—16 of Fig. 8; Fig. 17 is a detail view of the former mechanism and adjacent parts; Fig. 18 is a longitudinal sectional view of one of the form mandrels, taken on line 18—18 of Fig. 17; Fig. 19 is a detail sectional view taken on line 19—19 of Fig. 18; Fig. 20 is a vertical sectional view of one of the completed milk bottles; Fig. 21 is a fragmentary detail view of a modified form of bottle mandrel, and adjacent co-acting parts; Fig. 22 is a side view of the mandrel and a sectional view of its support; Fig. 23 is a longitudinal sectional view of the mandrel, taken on line 23—23 of Fig. 22; Fig. 24 is a transverse sectional view thereof, taken on line 24—24 of Fig. 22; and Fig. 25 is a transverse sectional view thereof, taken on line 25—25 of Fig. 22.

Referring to the drawings, the numeral 30 indicates the base portion, and 31 the standards on frame of the improved paper bottle forming machine. The standards project upwardly from the opposite end portions of the base, and at their upper ends are provided with bearings 32, in which is journaled an upper horizontal shaft 33. The shaft is driven by a worm wheel and worm connection 34 with the vertical shaft 35, and the vertical shaft is driven by a bevel gear connection 36 with the lower horizontal shaft 37 mounted on the lower side portion of one of the standards 31. The outer end of the lower horizontal shaft is provided with a belt wheel 38, for connection with a driving means (not shown), or the shaft may be driven in any other manner desired.

An upstanding tubular column 39 mounted on the base intermediate of the two end standards supports a revoluble table 40 on its upper end upon ball bearings 41. The hub 42 of the table is mounted on and revolved by a vertical central shaft 43, which is positioned and journaled in the tubular column, and at its lower end has a worm wheel and worm connection 44 with the lower horizontal shaft 37. The upper end of the central shaft 43 is journaled in a bracket 45, which projects downwardly from a fixed brush holder frame 46, carried by the upper horizontal shaft 33.

The table is provided with an annular upstanding flange 40' and with radial partitions 47, to divide the upper surface of the table into a plurality of paper supply pockets 48 and intermediate space pockets 49, to accommodate parts of the feeding mechanisms 50 mounted therein.

Movable bottom portions 51 having depending threaded stems 52 are provided for the paper supply pockets, and upon which the sheets of supply paper 53 rest. The depending stems extend through the table 40 and also through brackets 54 which are carried by the table. Split nuts 55 threaded on the stems, are fulcrumed on the hub portions 56 of the ratchet wheels 57 which are journaled in the brackets, and through which hub portions the threaded stems loosely extend. The nuts are normally and releasably held in threaded engagement with the stems by means of coiled springs 58 which are interposed between arms 59 projecting from and forming part of the split nuts 55, to permit the movable bottom portions 51 to be quickly depressed to refill the pockets with sheets of paper. The split nuts are intermittently revolved to keep the upper sheet of paper of each pocket in proper position to be picked up by other portions of the machine, by means of pawls 60 carried by elevating lever arms 61, which are journaled on the hub portions of the ratchet wheels 57.

As the table 40 is revolved and the sheets of paper are successively removed from the different pockets, the anti-friction rollers 62 carried on the outer ends of the elevating levers 61, will successively engage the cam 63 attached to the tubular column 39, and by means of the pawls 60 turn the split nuts 55 a partial revolution, and elevate the bottom portions 51 the thickness of the sheets of paper used.

The levers are retrieved by means of coiled springs 61', and ratchet wheels 57 are held against retrograde movement by holding pawls 60', which are pivoted to the frame and engage the said ratchet wheels.

The lower ends of the threaded rods 52 are provided with horizontally projecting fingers 64, which are adapted to engage and ring the bell 65 mounted on the tubular column, to indicate to the operator that the sheets of paper in the pocket of the depending arm which sounded the alarm, were almost gone and the pocket needed to be refilled.

As the sheets are removed from the pockets in consecutive order, the remaining sheets become more or less disarranged, and unless rearranged they would not be in proper position to be picked up by the other portions of the machine. To overcome this difficulty one of the radial partition walls of each pocket is provided with fingers 66 which are adapted to tap the disarranged sheets back into proper position from one side. The fingers are mounted on a rock shaft 67 which is carried by the partition, and the shaft extends inwardly through the annular upstanding flange 46, and at its inner end is provided with a dog 68, which rides on the under surface of the cam ring 69 carried by the bracket 45. A coiled spring 70 normally holds the fingers out of engagement with the paper when the sheets are being removed from the pockets, and the lower portion 71 of the cam surface swings the fingers into engagement with the remaining sheets when the upper sheet of each pack has been removed.

The disarranged sheets from the opposite sides of the packs are controlled by the angular fingers 72, which are journaled on the opposite radial partitions, and project upwardly to engage the said sheets. The outer horizontal ends of said fingers have arms 73 depending therefrom, which engage the semi-circular cam 74 adjustably carried by one of the standards 31, and swing the angular fingers 72 out of engagement with the sheets. The angular fingers are normally held in engagement with the sheets of paper by coiled springs 75 which surround the fingers and have their respective outer ends connected to the partitions and to the said fingers.

In order to securely hold the sheets of paper in position while the table is revolving, a holding mechanism is provided for each pocket, which comprises a vertically extending rod 76 slidably and revolubly mounted in a tube 77 connected to the peripheral edge of the table, and having a horizontally projecting finger 78 which extends over and bears upon the pack of paper in the pocket.

The lower end portions of the rods are of larger diameter than the major portions thereof, to provide shoulders 79 against which coiled springs 80 bear. The coiled springs are positioned within the tubes 77, and are interposed between the rod shoulders and caps 81 threaded on the upper ends of the tubes, to normally hold the fingers 78 in their lower position. Arms 82 mounted on the lower ends of the vertical rods 76 are also adapted to ride on the upper edge of the semicircular cam 74, to raise the fingers 78 from the packs of paper, and permit the turning of said rods and fingers. The rods are turned a partial revolution by the engagement of the arms 82 with the cam 83 connected to one of the standards 31, and positioned close to the semicircular cam 74. The cam 83 extends above the plane of the semicircular cam 74, so that while the arms are riding up and on the last mentioned cam, they will also engage the cam 83. The arms 82 are triangular form, to positively hold the fingers relatively in fixed positions when swung outwardly, and to provide projecting portions 84, which engage the angle member 85 to swing the rods and the fingers to their normal paper holding positions. Angled stop members 86 depending from the revoluble table 40 serve to limit the inward swing of the arms 82, and to hold said arms in their normal position. While only one of the paper holding mechanisms has been shown for each pocket it is to be understood that a greater number may be used if desired or found necessary.

The brush holder frame 46 is of semicircular form and is provided with a plurality of brushes 87, which cover approximately the whole inner surface of the flange 46' of said holder. The bristles of the brushes extend inwardly radially toward the shaft 33, and the brushes are slightly inclined to conform to the taper of the side portions of the bottles being formed. In order to adjust the inclination of the brushes and the wiping plates 90 inwardly, each brush is secured to the holder by a medial holding bolt 88 and outer adjusting bolts 89. The medial bolts secure the brushes to the holder, and adjust the distance of the brushes from the holder while the outer bolts are threaded through the holder and impinge against and incline the brushes.

The bristles of one of the brushes are dispensed with, and spring wiping plates 90 substituted therefor, which engage the bottles being revolved and moving past the said brush, and firmly press the glued portions of the papers together.

The lower portion of the flange 46' is provided with a curved guide plate 91, upon which the sheets of paper 53 are drawn when they are picked up preparatory to being wrapped around the conical mandrels 92 of the tubular revoluble head 93. The head 93 is keyed or otherwise fastened to the shaft 33, and turns therewith, and the conical mandrels carried by the head are journaled in said head and project outwardly horizontally to positions to sweep off the piles of paper in the pockets, which are successively turned into feeding position.

A hub portion 94 surrounding the shaft 33, and projecting toward the revoluble head 93, is loosely mounted on said shaft, and its tubular end portion 95 forms an air tight joint with the hub 96 of the head. The revoluble head is provided with air passageways or ducts 97, which extend from the inner face of the hub 96, to and through the spokes 98 of the head, to the bores 99 in which the tubular extension 100 of the conical mandrels 92 are journaled.

The tubular end portion of the hub is provided with an opening 101 extending about one half of the face of the hub with which the ducts 97 register when the head 93 is revolved. A pipe 102 connected to the tubular portion of the hub 94 is connected to a vacuum means (not shown), to create a vacuum or suction in said hub and ducts. The tubular extensions 100 of the conical mandrels 92 are provided with apertures 103 which communicate with the ducts 97 and the chambers 104 of the mandrels. The mandrels 92 are also provided with apertures 105, which extend in lines along one side to permit the suction to pick up sheets of paper with which the bottles are formed, as the mandrels roll over said sheets. The outer end portions of the mandrel extensions project through the head 93, and have gear wheels 106 mounted thereon which are adapted to mesh with the segmental rack bar 107 carried by one of the standards 31 when the particular mandrel is in position to pick up a sheet of paper. The gears 106 are provided with projecting pins 104' which are adapted to ride over the gear cam 105', in order to positively position the apertures 105 of the mandrels, with relation to the sheets of paper to be picked up.

In order to prevent the mandrels picking up the sheets of paper before they are in the proper position a yielding guard plate 91' mounted on one of the standards 31 is provided which is so positioned as to close the mandrel apertures 105 while the mandrels are passing over and in sliding engagement with the plate.

The plate is formed of a yielding material and its free edge portion is in the path of movement of the mandrels and is pressed downwardly on the sheet of paper to be picked up by the particular mandrel which is to pick up the sheet so that as the mandrel slides off the edge of the plate it will immediately contact with the sheet of paper at the proper point and the suction through the mandrel apertures will cause the advancing edge of the upper sheet of paper to firmly engage the mandrel and be carried therewith.

As the mandrel gears are rotated by engagement with the rack bar, the mandrels will revolve at the same rate of speed as the head is turning, and the mandrels in engaging the paper, which is also being carried by the revoluble table, at the same speed, will suck up the advancing edge of the upper sheet, and as the mandrel revolves the sheet will be wrapped therearound as it slides upon the curved guide plate 91. The outer end portions of the mandrel extensions are also provided with single-toothed ratchet wheels 106', which are engaged by pawls 107', to prevent retrograde rotation.

In order to hold the sheets of paper in shape when wrapped around the mandrels, the rear edge portions of the upper sheets are each provided with a line of warm adhesive material 108, by a gluing mechanism 109, which will now be explained. The gluing mechanism is located above the revoluble table at a point adjacent to the brush frame, and is supported on a bracket 110 projecting over the table from one of the standards 31. The said mechanism comprises a glue tank 111 of approximately rectangular shape, and having a conical roller 112 forming one of its side walls. A steam or hot water chamber 113 provided beneath the tank for keeping the adhesive material in liquid state, is supplied with the heating agent through suitable pipes 114 (only one being shown). A scraper 115 adjustably mounted beneath the tank has its forward beveled edge 115' bearing against the conical roller immediately beneath the glue tank, serves to permit only a thin film of glue to be discharged from the tank as the conical roller revolves. The conical roller is of tubular form, with closed ends, and has a tubular and perforated shaft 116, which is connected to a pipe 116' to supply steam or hot water to the chamber of said roller, to provide for keeping the roller at the same temperature as the tank. The outer end of the tubular shaft 116 has a sprocket wheel 117 mounted thereon, which has a sprocket chain connection with a sprocket wheel 118 mounted on a stud shaft 119 projecting from one side of the glue tank 109. Another sprocket wheel 120, journaled on the stud shaft and rotatively connected to the sprocket wheel 118, is rotated from any convenient source of motion.

A conical gluing roller 121 journaled in the outer end of a swing frame 122, is positioned immediately beneath and in contact with the roller 112, and is rotated by a geared connection 123 therewith, when in its upper position. The inner end of the swing frame is pivoted to the opposite sides of the glue tank 109. The outer free end of the said frame is held in its uppermost position and dropped to apply a line of glue to the upper sheets of the packs of paper passing therebeneath by an annular member 124 which is carried by the revoluble table. The free end of the swing frame 122 is provided with a depending foot 125 which rides on the annular member 124 and the said member has notched portions 126 into which the foot drops when the sheets of paper are in position to receive their lines of glue. The gluing roller 121 is yieldingly held in the swing frame 122 by springs 127 which bear against the journals 128 of the said roller, and permits the easy removal thereof. The springs 127 also permit the roller to yield laterally with relation to the roller 112 or the sheets of paper.

In order to provide a paper bottle with a neck of sufficient strength to receive and hold a paper cap or closure, and to also reinforce the side walls of the bottle, the upper end of the bottle is provided with a turned wooden neck 129 which has an annular inner shoulder 130 to hold the cap (not shown), and an outer reduced portion 131 which enters the paper portion of the bottle and is glued thereto.

The necks which are preferably formed of wood and may be made of any material desired, are automatically supplied to the mandrels preparatory to wrapping the paper therearound, by means which will now be described. The neck feeding mechanism comprises an inclined neck holder or runway 132, having a neck groove 133 formed therein, in which the necks 129 are placed. The neck holder is fastened to one side of the brush holder 46 with the lower discharge portion 134 of the holder in alinement with the arc of movement of the mandrels 92, and the mandrels have reduced outer end portions 92' around which the necks are placed. A gluing mechanism 135 for coating the reduced portion 131 of the neck is attached to and forms part of the neck holder 132, and is adapted to coat said portions while the necks are rolling down the incline to the lower discharge end of the holder. The lower medial portion of the holder is cut away to accommodate the upper portion of the glue belt 136 which is positioned with relation to the holder to engage the outer reduced portions of the necks 129, and apply a coating of glue thereto, before they are placed on the mandrels. The belt 136 is carried by pulleys 137 and 138, which are journaled on shafts 139 and 140 of the gluing mechanism. The shaft 139 is provided with a sprocket wheel 141, which is driven by a sprocket chain connection with a sprocket wheel 142 mounted on the brush frame 46. Another sprocket wheel 143 rotatively connected to the sprocket 142 is driven from any convenient source of motion.

A glue pot 144 located beneath the glue belt 136 is provided with a heating chamber 145 for steam or hot water, and with a glue wheel 146 which is positioned within the glue pot and bears against the lower portion of the glue belt 136, and feeds glue thereto. The glue wheel is journaled in a swing frame 147, which is provided with a weight 148 for holding the glue wheel yieldingly against the belt.

The feed of the bottle necks is controlled by a rock lever 149 which is pivoted on one side of the holder, and is provided with inwardly projecting pins 150 and 151. These pins extend into the path of travel of the necks, and are spaced apart a sufficient distance to straddle one neck so that when the pin 150 is swung downwardly to permit the neck engaged to roll downwardly to its discharging position, the pin 151 will be swung upwardly to check the feed of the other necks, and when the lever is swung to move the pin 151 downwardly, the pin 150 will be in position to receive another neck. The rock lever is normally held in the last mentioned position by a retrieving spring 152, and is swung to its other position by the engagement of the mandrels 92 with the free end of a trip lever 153, which is fulcrumed on the neck holder, and has its opposite end connected to the rock lever 149 by a coiled spring 154. The neck holder is adapted to be constantly supplied with necks from a source of supply not shown. When the necks are released by the rock shaft, and roll down to their discharging position, they pass out of the grooved portion of the holder, on to a curved holding member 155, and are also successively held by a swing lever 156 fulcrumed on the holder, and depending in front of the discharging position of the holder. The swing lever 156 is swung to one side of the neck by the mandrel which has turned to a position in alinement with the discharging position of the holder, and the lowermost neck in said holder. The necks are pushed on the reduced end portions 92' of the mandrels by a plunger 157, which is transversely slidably mounted in the lower end portion of the neck holder, and in alinement with the necks 129 held therein. The stem 157' of the plunger is provided with a recess 158, into which extends the lower end of the cam lever 159, which is fulcrumed on the brush holder 46. The upper end of the cam lever engages the crown cam 160 which is mounted on the shaft 33, and rotates therewith. The engaged edge of the cam is provided with a plurality of cams 160' which correspond in number to the number of the mandrels, and are so positioned with relation to the mandrels, as to permit a coiled spring 161 to actuate the plunger to place the necks on the mandrels in successive order when the mandrels register with the discharge portion of the neck holder. A stop 162 limits the forward movement of the plunger and the lever.

As soon as a mandrel receives its bottle neck, it is turned to a position to receive the sheet of paper of which the bottle is formed, and in wrapping the sheet around the mandrel the sheet is also wrapped around the reduced and glued portion of the neck, thus connecting the two portions of the bottle together. When the mandrels having the partly formed bottles mounted thereon, have engaged all of the brushes, the bottles are thus in condition to be removed, and are engaged by a conical rubber discharging brush 163 carried on the brush frame, and in the path of travel of the mandrels. The rubber brush is of serrated form in transverse section, and extends axially in transverse relation to the mandrels with the larger diameter lowermost to increase the frictional contact of the bottles with the brush as the mandrels swing downwardly. The brush is mounted on a short shaft 164 which is journaled in a bracket 165 mounted on the brush frame 46. The bracket 165 also carries a short horizontal shaft 166 which has a beveled gear connection 167 with the brush shaft 164. A stud shaft 168 projecting from the brush frame has journaled thereon a gear 169, which is in mesh with a pinion 170 on the horizontal shaft, and also has a sprocket wheel 171, which has a sprocket chain connection with a sprocket wheel 172 mounted on the crown cam 160, thus providing means for rotating the rubber discharging brush.

A circular guide bar 173 mounted on the brush frame 46 is positioned close to the path of travel of the bottle necks when on the mandrels, and serves to prevent the necks from accidentally falling off while revolving in the brush frame 46. In the modified form of mandrel shown in Figs. 21 to 25 inclusive, the mandrel is of the collapsible form, to permit the bottle to be more easily removed therefrom, than in the solid, or first mentioned form. This form of mandrel is provided with a longitudinally extending slot 174, in which is positioned a collapsing bar 175, which conforms to the contour of the mandrel when in its outer position. The smaller end of the bar is connected to the mandrel by a pivot pin 176, and the larger or free end is connected to the mandrel by a holding screw 177, which limits the outer movement of said bar. Coiled springs 178 interposed between the free end of the bar and the mandrel, normally hold the bar in its outer position. When the bottle has been formed on the mandrel, and the mandrel is being turned to its discharging position, a pin 179, projecting from the yielding end of the collapsing bar, will engage a cam member 180, and the said bar will be forced inwardly, and thus loosen the bottle so that when engaged by the discharging brush, it may be easily removed from the mandrel. The sheets of paper are cut to form before being placed in the pockets, and after the bottles are discharged from the machine, the bottoms 181 are placed in the bottles in any manner desired.

From the foregoing description it will be seen that the paper bottle forming machine is well adapted for the purpose desired.

What I claim as my invention is:

1. A bottle forming machine, comprising a frame, a revoluble member mounted thereon, a plurality of revoluble tubular mandrels mounted on the revoluble member and having suction openings in their peripheries, means for feeding bottle necks to the mandrels, means for feeding sheets of paper to the mandrels, and means for applying adhesive material to the sheets of paper.

2. A bottle forming machine, comprising a frame, a revoluble member mounted thereon, a plurality of revoluble tubular mandrels mounted on the revoluble member, and having suction openings in their peripheries, means for feeding bottle necks to the mandrels, a revoluble table provided with spaces for holding sheets of paper to be fed to the mandrels, and means for applying adhesive material to portions of the sheets of paper.

3. A bottle forming machine, comprising a frame, a revoluble member mounted thereon, revoluble tubular mandrels mounted on the revoluble frame, and having suction openings in their peripheries, means for feeding and applying bottle necks to the mandrel ends, means for applying adhesive material to portions of the necks, a revoluble table provided with spaces for holding sheets of paper to be fed to the mandrels, means for applying adhesive material to portions of the sheets, and means for wrapping the sheets around the mandrels and the necks.

4. A bottle forming machine, comprising a frame, a revoluble tubular member mounted thereon, revoluble tubular conical mandrels journaled on the revoluble member, and having suction openings in their peripheries, means for feeding and applying bottle necks to the mandrel ends, means for applying adhesive material to portions of the necks, a revoluble table provided with spaces for holding sheets of paper to be fed to the mandrels, a gluing mechanism for applying adhesive material along one edge of each sheet of paper, a plurality of brushes positioned in the path of travel of the mandrels, for engaging the sheets of paper on the mandrels, and means for revolving the mandrels.

5. A bottle forming machine, comprising a frame, a revoluble tubular member mounted thereon, revoluble tubular conical mandrels journaled on the revoluble member, and having suction openings in their peripheries, means for feeding and applying bottle necks to the mandrel ends, means for applying adhesive material to portions of the necks, a revoluble table provided with spaces for holding sheets of paper to be fed to the mandrels, a gluing mechanism for applying adhesive material along one edge of each sheet of paper, a plurality of brushes positioned in the path of travel of the mandrels, for engaging the sheets of paper on the mandrels, means for revolving the mandrels before the sheets of paper wrapped thereon are engaged by the brushes, and means for discharging the bottles from the mandrels.

6. A mandrel for a paper bottle forming machine, comprising a tubular conical member having an opening to permit the air to be exhausted therefrom and a longitudinal line of apertures extending along its periphery through which the air is drawn, said member also having a groove extending longitudinally of its length, and a bar fitting into the groove and having a yielding connection with the conical member.

7. A mandrel for a paper bottle forming machine, comprising a tubular conical member having an opening to permit the air to be exhausted therefrom and a longitudinal line of apertures extending along its periphery through which the air is drawn, said member also having a groove extending longitudinally of its length, and a bar fitting into groove and having a pivotal and a yielding connection with the conical member.

8. A wrapping mechanism for a paper bottle forming machine, comprising a frame, a revoluble tubular member mounted thereon, a plurality of conical tubular mandrels journaled in the tubular member and having their chambers communicating with the tubular portions of the tubular member, said mandrels provided with suction openings for engaging sheets of glued paper, a circular brush frame provided with a plurality of brushes which are positioned in the path of travel of the mandrels and engage the sheets of paper thereon, a curved member positioned adjacent to the path of travel of the mandrels and over which the sheets of paper pass, and means for rotating the mandrels while adjacent to the curved member.

9. A wrapping mechanism for a paper bottle forming machine, comprising a frame, a revoluble tubular member mounted thereon, a plurality of conical tubular mandrels journaled in the tubular member and having their chambers communicating with the tubular portions of the tubular member, said mandrels provided with suction openings for engaging sheets of glued paper, a circular brush frame provided with a plurality of brushes which are positioned in the path of travel of the mandrels and engage the sheets of paper thereon, a curved member positioned adjacent to the path of travel of the mandrels and over which the sheets of paper pass, means for rotating the mandrels while adjacent to the curved member, and means limiting the rotation of the mandrels.

10. A wrapping mechanism for a paper bottle forming machine, comprising a frame, a revoluble tubular member mounted thereon, a plurality of conical tubular mandrels journaled in the tubular member and having their chambers communicating with the tubular portions of the tubular member, said mandrels provided with suction openings for engaging sheets of glued paper, means for preventing retrograde movement of the mandrels, a circular brush frame provided with a plurality of brushes which are positioned in the path of travel of the mandrels and engage the sheets of paper thereon, a curved member positioned adjacent to the path of travel of the mandrels and over which the sheets of paper pass, means for rotating the mandrels while adjacent to the curved member, and means limiting the rotation of the mandrels.

11. A bottle forming machine, comprising a frame, a revoluble member mounted thereon, a plurality of revoluble tubular mandrels mounted on the revoluble member and having suction openings in their peripheries, means for feeding sheets of paper to the mandrels, and a yielding guard positioned to close the suction openings just before the mandrels are in a position to engage the paper.

In testimony whereof, I affix my signature, in presence of two witnesses.

MAXIMILLIAN P. JANISCH.

Witnesses:
    KATHERINE HOLT,
    EMILY SCHOWALTER.